July 2, 1968 R. E. CRUGER ETAL 3,391,389

DIGITAL HARMONIC REJECTION CIRCUIT

Filed May 8, 1964 2 Sheets-Sheet 1

INVENTORS
RICHARD E. CRUGER
MICHAEL J. INGENITO
BY Louis Altman
ATTORNEY

DIGITAL HARMONIC REJECTION CIRCUIT

Filed May 8, 1964 2 Sheets-Sheet 2

United States Patent Office 3,391,389
Patented July 2, 1968

3,391,389

DIGITAL HARMONIC REJECTION CIRCUIT

Richard E. Cruger, Peekskill, and Michael J. Ingenito, Bronx, N.Y., assignors to General Time Corporation, New York, N.Y., a corporation of Delaware Filed May 8, 1964, Ser. No. 365,871
8 Claims. (Cl. 340—171)

ABSTRACT OF THE DISCLOSURE

A digital frequency-discriminating circuit of the type which employs a delay circuit, and logic gates to compare the period of the delay circuit with the period of an incoming signal, would ordinarily respond to the third harmonic of the desired signal. However, an extra flip-flop is made one of the inputs to a coincidence gate and is timed to block third harmonic response. The delay circuit is a particular type of monostable uniquely suited to the requirements of the third harmonic rejection operation.

This invention concerns digital frequency-discriminating circuits, and is particularly concerned with a harmonic rejection circuit or digital "filter" for use at lower frequencies where it is undesirable to use conventional resonant filters.

The basic type of frequency-discriminating circuit with which this invention is concerned is disclosed in U.S. patent application Ser. No. 253,193 filed Jan. 22, 1963, by Anderson and Rennie now Patent No. 3,319,225 issued May 9, 1967. This application shows a remote control system which performs certain functions when and only when the system receives an input signal consisting of a certain selected frequency. In order to distinguish one frequency from another, the system employs purely digital circuitry such as Schmitt triggers, differentiators, and monostable multivibrators of the magnetic type, together with gating circuitry. No conventional resonant filters are used in the actual frequency-discriminating portion of the system. However, a conventional resonant low pass filter is used in the front end of the system simply to keep out high frequency noise. The low pass filter also blocks out the third and higher odd harmonics of the desired control frequency, since the digital circuit disclosed in the aforesaid patent application is not capable of distinguishing between a given frequency and its odd harmonics.

However if digital circuits of this type are to operate at very low frequencies, it is no longer desirable to rely on resonant low pass filter circuits to block out these odd harmonics, because as the operating frequency becomes lower resonant low pass filters become increasingly bulky and expensive due to the size of the inductor required. For example, in an actual application a remote control system was desired which would respond to a control frequency of a thousand cycles per scond chopped at a rate of twenty cycles per second. A resonant low pass filter could easily be designed and built to block out frequencies above a thousand cycles per second. Digital frequency-discriminating circuitry was then designed in accordance with this invention to detect both the thousand cycle characteristic of the control input and also the twenty cycle chopping rate. However a way had to be found to prevent the circuit from responding to the third harmonic of twenty cycles per second. Since the third harmonic of twenty cycles is sixty cycles, it will be readily appreciated that this is a common power line frequency and therefore there are abundant sources of noise at this frequency. A resonant low pass filter of conventional construction would have served to block out sixty cycle noise, but would have entailed considerable expense and occupied too much space.

In accordance with a principal object of this invention, therefore, a digital technique is provided for blocking out the third harmonic of the low frequency chopping rate. By way of illustration, this object may be achieved by means of a digital frequency-discriminating circuit comprising means for receiving a periodic input signal and generating marker signals to mark the rising and falling portions thereof respectively. A three-input and-gate is connected to receive one of these marker signals as a first input. Delay means are provided which are responsive to the other one of the marker signals. The delay means is connected to apply a second input to the and-gate a selected time interval after the occurrence of the other one of the marker signals. As a result, the first and second and-gate inputs coincide only when the input signal has a frequency bearing a selected relation to the particular time interval. Finally, means are provided which supply a third input to the and-gate to enable the gate whenever the input signal frequency is below the third harmonic of the desired control frequency, but which disables the gate whenever the input signal frequency is equal to or greater than the third harmonic of the desired control frequency.

Another object of the invention is to provide a low pass filter which is completely digital in operation and does not require any resonant circuits, and which therefore is especially well adapted for use in low frequency circuits where excessive bulk and expense must be avoided.

Still another object of the invention is to provide a frequency-discriminating remote control system which responds to a compound set of conditions such as a signal of a given frequency $f_1$ gated by a lower frequency $f_2$.

A further object of the invention is to provide a delay monostable circuit for use in a digital filter, which monostable circuit is not retriggerable during its output phase by spurious pulses. Such pulses are associated with harmonic frequencies higher than the desired control frequency but not high enough to be conveniently removed by low pass filters of the conventional resonant circuit type when the control frequency is low.

For a fuller understanding, the invention will now be described in detail by reference to the following drawings.

Figure 1:
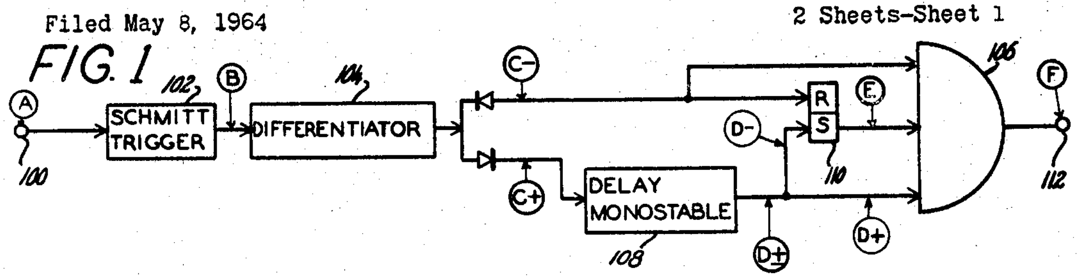
FIG. 1 is a block diagram summarizing the operation of a basic third harmonic blocking circuit in accordance with the principles of this invention.
Figure 2:
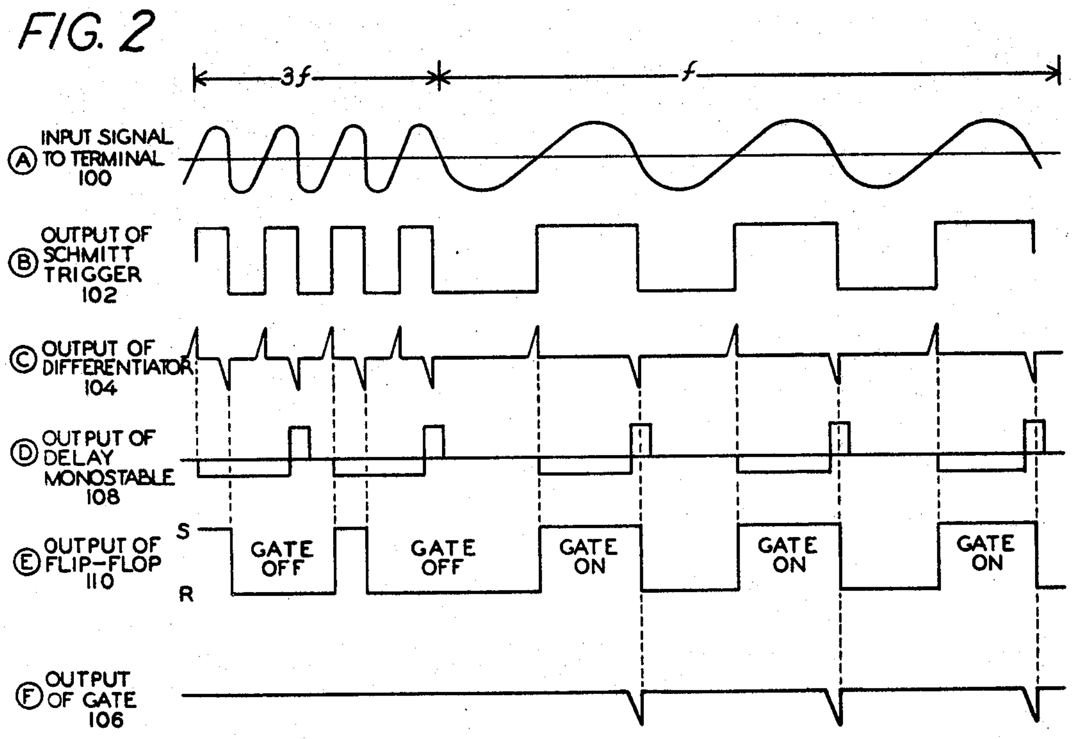
FIG. 2 is a set of voltage waveforms as a function of time, illustrating the operation of the system shown in FIG. 1.

The system summarized in the block diagram of FIG. 1 includes an input terminal 100. The notation employed in this figure indicates that waveform A of FIG. 2 is applied to this input terminal 100. From FIG. 2 waveform A is seen to be a sinusoidal voltage starting off with a frequency of $3f$ and subsequently changing to a frequency of $f$. The sinusoidal input is received by a Schmitt trigger circuit 102 and converted by it into a square wave of the same frequency as the sinusoidal input. The Schmitt trigger output corresponds to waveform 2B. A differentiator circuit 104 receives the square wave and converts the rising and falling edges thereof into positive and negative spikes respectively. The differentiator output is shown as waveform 2C. The positive and negative spikes in waveform 2C are split up by rectifying means and made to issue over separate leads which are marked C minus and C plus. The C minus differentiator output, consisting of all the negative spikes in waveform 2C, is applied directly to a three-input and-gate 106. The C plus differentiator output, consisting of all the positive spikes in waveform 2C, is applied to a delay monostable circuit 108. Whenever this circuit is in a quiescent condition, it is triggered by a positive spike from the differentiator 104, and passes through a predetermined delay period during which it generates a low negative output, and then at the end of the predetermined delay period it produces a high positive square output pulse. This positive output pulse, designated D plus, is connected to provide a second one of the three inputs to and-gate 106.

As so far described, this circuit is the basic frequency-discriminator previously disclosed in the aforesaid patent application. Whenever the signal input has the desired control frequency $f$, the interval between positive and negative spikes of waveform 2C (i.e. one-half the period of a waveform 2B or 2A) becomes equal to the delay period of the monostable circuit 108. Since the delay period of the monostable circuit begins with a C plus spike, at this particular frequency $f$ the D plus output pulse occurring at the end of the delay period will coincide with the next following C minus spike. The coincidence of the C minus and D plus pulses which occurs only at the desired control frequency $f$ can be detected by an and-gate such as gate 106 to produce an output such as waveform 2F, consisting of the C minus spikes which have passed through the and-gate 106. This waveform 2F appears at an and-gate output terminal 112.

As the signal frequency varies slightly above or below $f$, coincidence with the C minus spike will occur later or earlier during the duration of the D plus pulse. If the variation is too great, the spike occurs after or before the D plus pulse, and there is no coincidence and hence no output. Therefore the duration of this pulse determines the width of the pass band.

What has been described so far is the action of a basic digital frequency-discriminating circuit when the input signal has the desired control frequency $f$. It has been seen that this action depends upon the coincidence between a C minus spike and a D pulse which occurs at the desired frequency $f$. However such coincidence between a C minus spike and a D plus pulse can also occur at other frequencies which are equal to odd harmonics of $f$. As seen in FIG. 2, when the input frequency is, for example, $3f$, the third harmonic of the desired control frequency, a similar pulse coincidence takes place. First, a C plus spike triggers monostable circuit 108 and initiates a delay period. The first C minus spike following the triggering spike occurs during the delay period of monostable circuit 108, which is too soon to coincide with the D plus pulse. Therefore this first C minus spike does not pass through the and-gate 106. Next there occurs a second C plus spike during the latter part of the delay period of monostable circuit 108. This second C plus spike has no affect on the monostable circuit 108 or on the operation of the frequency-discriminating system because circuit 108 is designed to be non-retriggerable. Finally, a second C minus spike occurs which coincides with the D plus output pulse occurring at the end of the delay period of monostable circuit 108. If no special precautions are taken, this pulse coincidence will energize the and-gate 106 and produce an output at the terminal 112 even though the input signal frequency is $3f$ instead of the desired control frequency $f$.

The same problem is encountered with any odd harmonic of the fundamental desired control frequency $f$. To generalize, when the frequency received is the desired control frequency $f$, which may be thought of as the first harmonic of the fundamental $f$, then the first C minus spike following the C plus spike that triggers the delay monostable circuit 108 will coincide with the D plus output pulse of circuit 108. If the frequency received is the third harmonic $3f$, then the second C minus spike following the C plus spike which triggers circuit 108 will coincide with the D plus output pulse of circuit 108. For the fifth harmonic $5f$, it will be the third C minus spike which coincides with the D plus output pulse. And in general, for any $n$th harmonic $nf$, where $n$ is an odd number, the C minus spike number (1 plus $n$)/2 after the C plus spike which triggers the monostable circuit 108 will coincide with the D plus output pulse from circuit 108.

The purpose of the third harmonic blocking digital filter of this invention is to prevent the frequency-discriminating circuit from responding to the old harmonics of $f$, while still allowing the circuit to respond to $f$ itself. In the illustrative embodiment of FIG. 1, this is accomplished by providing a third input lead to the and-gate 106. The third input is controlled by a flip-flop 110 in such a manner that the flip-flop provides an output to enable the gate 106 at the time of coincidence between a C minus spike and a D plus pulse whenever the signal input frequency is no higher than $f$, but the flip-flop 110 deprives the and-gate 106 of its third input and thus disables the gate whenever the signal input frequency exceeds $f$. Thus the flip-flop 110 may be regarded as having the properties of a low pass filter which blocks the harmonics of $f$, yet it does so employing only pulse and digital techniques, without the need for convention low pass filters of the resonant circuit type which would be bulky and expensive if designed for low frequencies.

The operation of flip-flop 110 as a harmonic blocking filter is illustrated in FIG. 2. Assume that at the time that the first C plus spike triggers the delay monostable circuit 108, the flip-flop 110 is in the one of its two stable states which enables the and-gate 106. The output of flip-flop 110, which represents the third input to the and-gate 106, is shown by waveform E of FIG. 2. Thus, looking at the region of FIG. 2 which illustrates operation when the input signal frequency is $3f$, we see that at the time of occurrence of the first C plus spike which triggers the delay monostable circuit 108 the flip-flop 110 is set, and therefore its output voltage is at the high level required to enable the gate 106. Whenever the frequency of the input signal exceeds $f$ the first C minus spike following the initial C plus spike will occur during the delay period of the monostable circuit 108. This first C minus spike is applied to the reset input of flip-flop 110 and switches the flip-flop so that its output voltage drops to the lower condition and disables the and-gate 106. During the remainder of the delay period and output pulse period of the monostable circuit 108, the flip-flop 110 remains reset and therefore keeps the and-gate 106 disabled. The next spike which occurs in waveform 2C is a positive one, and it has no effect because the delay monostable circuit 108 is designed to be immune from retriggering. The next spike to occur in waveform 2C is another negative one. When the signal frequency is the third harmonic $3f$, as illustrated, this spike coincides with the D plus output pulse. Thus two of the necessary three inputs to and-gate 106 are supplied simultaneously. However the fact that flip-flop 110 is reset keeps the gate 106 disabled, and the spurious gate output pulse offered by a signal input frequency of $3f$ is therefore rejected by the gate 106 and no output appears on the terminal 112. For other frequencies higher than $f$ the operation would be similar. After the first C plus spike which triggers the monostable circuit 108, the next spike is a negative one which resets the flip-flop 110 and thus disables the gate 106 for the remainder of the operating period of the monostable circuit 108. No matter how many C plus spikes may follow during the remainder of this operating period, the monostable circuit 108 is designed to be non-retriggerable. And no matter how many C minus spikes may occur during this operating period, they too have no effect on the operation of the circuit. In particular, if the higher frequency happens to be an odd multiple of $f$, then the last of the C minus spikes to occur during the operating period of the monostable circuit 108 will coincide with the D plus output pulse, but the third input to the gate 106 from flip-flop 110 will still be lacking and therefore no output will pass through the gate to the terminal 112.

When a frequency of $f$ is received, then an output does pass through the gate 106 to the terminal 112. This is because at the beginning of every operating cycle of the delay monostable circuit 108 the leading edge of the D minus pulse is applied to set the flip-flop 110 so that the assumed initial conditions are restored and the gate 106 is enabled once again for the start of each cycle. When the input signal has the desired control frequency $f$, the flip-flop 110 remains set and therefore the gate 106 remains enabled throughout the delay period of the monostable circuit 108, because under these conditions no C minus spike occurs during this delay period. Then, when the first C minus spike after the initial C plus spike does occur, it does so at a time which causes it to coincide with the D plus output pulse at the end of the delay period of the monostable circuit 108. Thus coincidence of the C minus spike and the D plus output pulse takes place at a time when the set output of the flip-flop 110 is keeping the gate 106 on. Therefore an output in the form of the C minus spike passes through the gate 106 to the output terminal 112, as shown by waveform 2F. The same C minus spike which coincides with the D plus pulse to produce this output also causes the flip-flop 110 to be reset before the completion of the D plus output pulse, and this in turn causes the gate 106 to be disabled, but not before the C minus spike has had a chance to pass through the gate 106 to produce the output which indicates that a frequency of $f$ is being received.

Now that the basic principles of the digital filter of this invention have been explained, a practical system embodying those principles will now be described in detail in connection with the circuit diagram fo FIG. 3. In this way certain important features of the invention can best be explained. These include the manner in which the monostable circuit 108 is made non-retriggerable, and also the operation of a digital filtering system which is designed to detect a compound set of input signal conditions, e.g. a higher frequency $f_1$ chopped at a lower frequency $f_2$. It is in systems of this sort that one is most likely to encounter a frequency $f_2$ which is sufficiently low so that low pass filters of the conventional resonant circuit type begin to be so bulky and expensive that a digital low pass filter in accordance with the invention is desirable.

Figure 3:
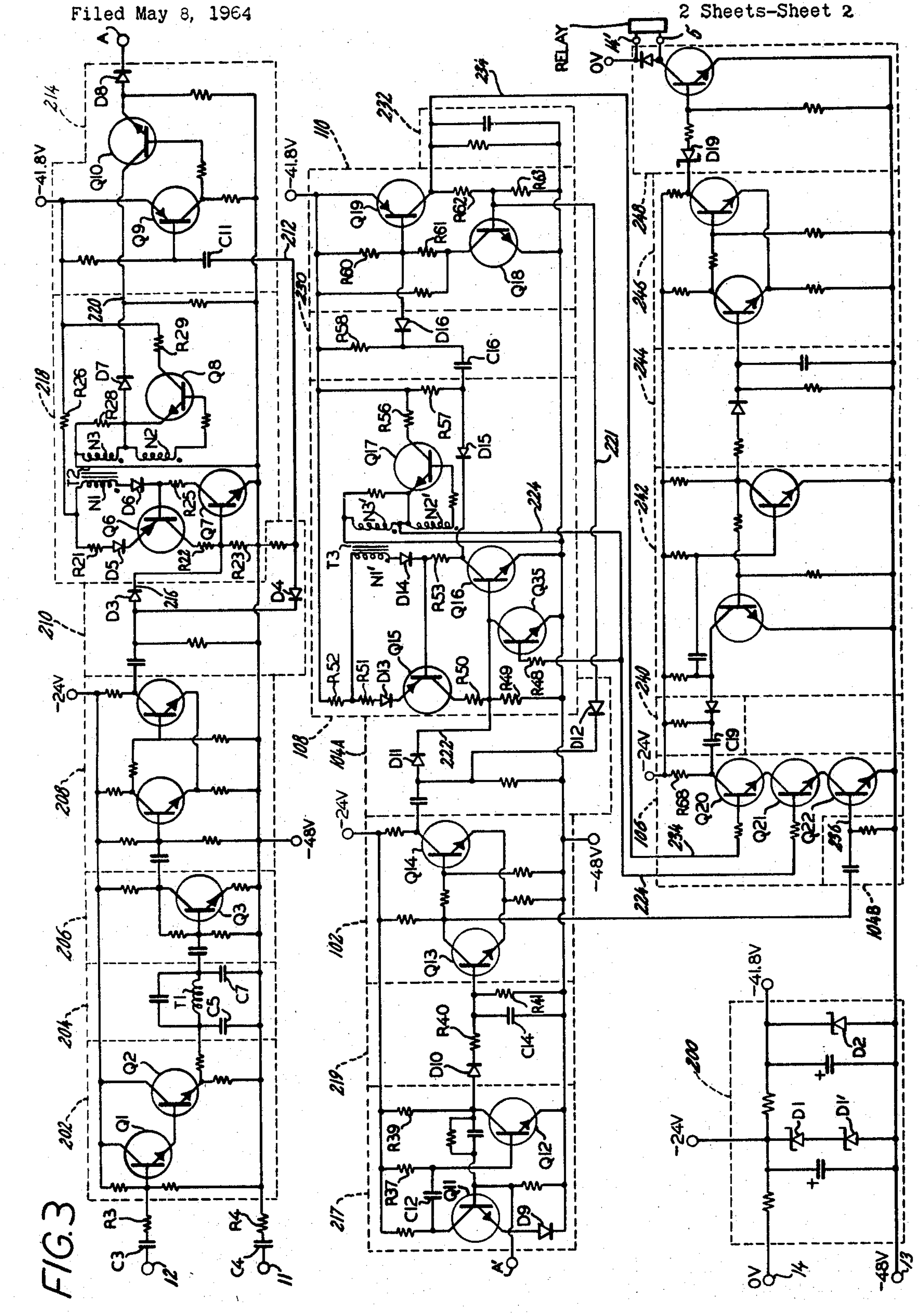
FIG. 3 is a circuit diagram of a full scale system in accordance with the principles of this invention for detecting a higher frequency $f_1$ chopped at a lower frequency $f_2$, and incorporating a third harmonic blocking feature.

The system of FIG. 3 includes a power supply circuit 200. A first input terminal 13 of the power supply circuit 200 is connected to a source at minus 48 volts. The ground potential of the entire system shown in FIG. 3 is common with this terminal. The other input terminal 14 is connected to a source at zero volts. The output voltage at one of the power supply terminals is regulated at minus 24 volts by a pair of series Zener diodes D1 and D1'. The output level at another power supply terminal is regulated at minus 41.8 volts by a Zener diode D2. These supply voltages are employed at various points in the remaining circuitry as will be seen in the following discussion of FIG. 3.

The desired control signal which activates the circuit of FIG. 3 is a sinusoidal input of frequency $f_1$ chopped at a lower frequency $f_2$. In a typical practical embodiment, $f_1$ would be about a thousand cycles per second, and $f_2$ would be about twenty cycles per second. Thus the control input is a thousand cycle signal gated on in bursts corresponding to every other half cycle of a twenty cycle signal. This input is applied across a pair of terminals 11 and 12. The following circuitry comprises a digital frequency-discriminator which is "tuned" to one thousand cycles per second. For every cycle of an input signal having a frequency of one thousand cycles per second, an output appears at terminal A. This output, in the form of pulses having a repetition rate of one thousand cycles per second, is then applied to terminal A'. The following circuitry comprises another digital frequency-discriminating circuit which is "tuned" to twenty cycles per second. In order to avoid spurious response to noise at any frequency which is an odd multiple of twenty cycles, this portion of the circuit includes the digital harmonic blocking feature of FIGS. 1 and 2. It also incorporates means for rendering the monostable circuit 108 non-retriggerable during any part of its operating cycle.

Looking first at the thousand cycle portion of the circuit, the signal input is applied across the terminals 11 and 12. Terminal 11 is connected through an isolating network C4, R4 to a ground bus which is connected to the system ground potential of minus 48 volts. Terminal 12 is connected through an isolating network C3, R3 to a linear amplifier circuit 202, having two stages Q1 and Q2. The output of amplifier 202 is passed through a low pass filter 204 which is designed to pass only frequencies of a thousand cycles per second and less. This is a conventional pi type filter employing resonant circuit elements C5, T1, and C7. For use at frequencies in the neighborhood of a thousand cycles per second, such filters are not unduly bulky or expensive.

The output of low pass filter 204 is boosted by another linear amplifier 206 comprising a single stage Q3. Then the output of amplifier 206 is applied to a thousand cycle frequency-discriminator. This includes a Schmitt trigger 208 which squares the sinusoidal output derived from amplifier 206. The rising and falling portions of the square wave output from Schmitt trigger 208 are detected by a differentiating circuit 210. The output of this circuit comprises a series of positive spikes indicating the rising portions of the square wave, transmitted through diode D3, interspersed with a series of negative spikes indicating the falling portions of the square wave, transmitted through diode D4. In accordance with the basic frequency-discriminating technique, the negative output of the differentiator 210 is applied over a lead 212 to an and-gate circuit 214. The positive output of the differentiator 210 is applied over a lead 216 to a delay monostable circuit 218, and the output of this circuit 218 is applied over a lead 220 as a second input to the and-gate 214. From a block diagram point of view, the thousand cycle frequency-discriminating circuitry so far described functions exactly the way the system of FIGS. 1 and 2 functions, except for the omission of the flip-flop 110 and its associated input lead to the and-gate 106, since at a frequency of one thousand cycles a digital harmonic blocking filter is unnecessary. The conventional low pass filter 204 does the same job and is not unduly bulky or expensive.

The operation of the thousand cycle frequency-discriminator will now be considered from a circuit diagram point of view. The delay monostable circuit 218 is a magnetic multivibrator of the same type as was disclosed in the aforesaid patent application, Ser. No. 253,-193. The positive spike issuing from the differentiator circuit 210 over lead 216 drives the base of an NPN input stage Q7, turning Q7 on. Current then flows from the minus 41.8 volt input terminal (this is a positive power supply input relative to ground which is minus 48 volts) through R26 and winding N1 which is wound about a square loop magnetic core T2. The current path continues through D6, R25, and Q7 to the ground bus. This current through winding N1 begins to run the core T2 up the hysteresis loop toward saturation. The voltage drop across winding N1 during the time that core T2 is being saturated is large enough to drive the base of a sustaining stage Q6 negative, and thereby turn Q6 on. Current then flows from R26 through R21, D5, Q6, R22, and R23 to the ground bus. This current causes a voltage drop across R23 which sustains the conduction of Q7 after the initial positive triggering spike from lead 216 has terminated. Therefore stages Q6 and Q7 regeneratively latch each other into conduction while the current continues to be drawn through winding N1 for the time necessary to saturate core T2. When T2 saturates, the impedance of winding N1 drops, the voltage drop across it decreases accordingly, and therefore the base voltage of Q6 increases and allows Q6 to turn off. Without the regenerative latching provided by Q6, Q7 then turns off to terminate the setting phase of the circuit 218.

While the core setting current is flowing in winding N1 the dotted end of that winding is negative relative to the other end. Therefore the dotted end of winding N2, which is also wound on the core T2 is also driven negative relative to its other end. This winding is connected across the base and emitter of a resetting stage Q8. The polarity induced in winding N2 during the setting phase of circuit 218 is such as to hold Q8 off. Also, the dotted end of winding N3, which is also wound on the core T2, is driven negative relative to its other end. Since the other end of winding N3 is connected to the ground bus, this means that the voltage applied by the dotted end of winding N3 to the anode of D7 (which may be regarded as the output voltage of the circuit 218) is somewhat negative relative to ground during the setting phase of circuit operation. This explains the shallow negative output developed during the delay phase of operation of monostable circuit 108 which is very similar in its operation to the monostable delay circuit 218. Hence the distinctive waveform seen in FIG. 2D.

As winding N1 drives core T2 to saturation, the core is first driven somewhat beyond its residual flux level before the turn off of stages Q6 and Q7 can be completed. Following this, core T2 relaxes back to its residual flux level. This drop back of flux induces a voltage of the opposite polarity in winding N2, i.e. of the polarity to turn on the resetting stage Q8. This causes current to be drawn from the minus 41.8 volt input terminal through R29 and Q8. The emitter current of Q8 then flows through winding N3 to the ground bus. R28 shunted across N3 is a damping resistor for dropping inductive kickback voltages. During the time that current flows through winding N3 its dotted end is positive relative to the other end. Therefore a voltage is induced in winding N2 which is of the same polarity, which causes Q8 to remain in conduction. The current through winding N3 serves the purpose of resetting the core T2 to its original condition of saturation. When this has been accomplished, the permeability of the core T2 drops and the voltage developed across winding N2 is no longer sufficient to sustain conduction of Q8. Therefore Q8 turns off and the operating cycle of the circuit 218 is terminated, leaving core T2 in its initial condition of saturation for the start of the next cycle. During the time that the core is being reset the voltage applied to the anode of D7 is quite high owing to the low impedance presented by Q8 when it is turned on. Therefore during the resetting phase of operation of circuit 218 a high positive pulse is delivered to the diode D7 and over the lead 220 to the gate 214. This corresponds to the D plus output pulse in FIG. 2 which is delivered by the similar monostable circuit 108.

By itself, the positive pulse applied to lead 220 does no more than energize the collector of a gating stage Q10. Without a coinciding Q10 base drive, however, no output is provided by the gate 214. The negative differentiator spike issuing from the circuit 210 over the lead 212 is coupled through a capacitor C11 to energize the base of another gating stage Q9. This turns on Q9 and causes its collector voltage to rise. This energizes the base of the other stage Q10. Should this occur when the collector of Q10 is not energized, there will be no output from the gating circuit 214. However if these two inputs to the gate 214 coincide, then the base and collector energization of Q10 occurs at the same time and a positive output is passed through D8 to the output terminal A. The output would be similar to the gate output shown in FIG. 2F for the gate 106, and would consist of spikes having the same waveform as the output of the differentiator circuit 210, which would be similar to the negative half of waveform 2C. The output voltage on terminal A is positive simply because the gate 214 is an inverter as well as a gate, a feature which was not shown in FIGS. 1 and 2.

The repetition rate of the spikes appearing on output terminal A is equal to the repetition rate of the negative spikes issuing from the differentiator circuit 210 over lead 212, which in turn is equal to the signal frequency applied to the input terminals when coincidence occurs in the gate 214; i.e. one thousand cycles.

This thousand cycle spike waveform from terminal A is applied to terminal A' so that the following circuitry can determine whether it is being chopped at a frequency of twenty cycles per second. Circuit 217 is a transistor monostable multivibrator which serves the purpose of stretching the narrow spikes applied to the terminal A'. The second stage Q12 of this circuit is normally on; therefore current flows from the minus twenty-four volt source terminal through R39 and Q12 to a ground bus which is connected to the minus forty-eight volt ground potential for the system. The drop across R39 causes the base of the first stage Q11 to be sufficiently low so that this stage is turned off. Each positive spike applied to terminal A' energizes the base of the first stage Q11 and causes it to turn on. When this stage turns on base current which is flowing through R37 to sustain conduction of the second stage Q12 is diverted through C12, Q11, and D9 to the ground bus. This causes Q12 to turn off, so that the voltage drop across R39 is reduced causing the Q12 collector voltage to go positive. After the spike applied to terminal A' has terminated and the capacitor C12 is charged, base current again flows from R37 to Q12, allowing Q12 to turn on. This causes its collector voltage to drop again, which in turn causes Q11 to turn off, returning the monostable circuit 217 to its initial condition in time for the next spike applied to terminal A'. The charging period of capacitor C12 is chosen to be somewhat larger than the duration of the input spikes, so that the positive output pulse appearing on the collector of Q12 is stretched.

Each positive output pulse is applied to a diode pump integrator circuit 219. This circuit serves to integrate the thousand cycle frequency input so as to filter it out, while allowing the twenty cycle chopping frequency to pass through relatively unaffected. Each positive output pulse from the collector of Q12 passes through the diode D10 and charges capacitor C14 through resistor R40. Between spikes C14 discharges through resistor R41. R41 is much larger than R40, so that the capacitor charges rapidly and discharges slowly to maintain a relatively constant voltage level when the input frequency is a thousand cycles. However R41 is small enough so that when the signal is turned on and off in twenty cycle bursts C14 has sufficient time to discharge through R41. Therefore the voltage across the capacitor follows the changes which occur at a twenty cycle rate but not those which occur at a thousand cycle rate. Circuit 102 is the Schmitt trigger of FIG. 1. It receives the relatively constant voltage, chopped at a twenty cycle rate, from the integrator 219 and squares up the waveform of the twenty cycle signal. Circuit 104A which receives the output of the Schmitt trigger 102 is one of a pair of differentiator circuits in this system which corresponds to the differentiating means 104 of FIG. 1. The other circuit which corresponds to the differentiating means 104 of FIG. 1 is differentiator 104B of FIG. 3. This circuit also receives an output from the Schmitt trigger 102.

Differentiator 104A provides a first output consisting of a train of negative spikes. This output passes through the diode D12 and issues over a lead 221 to the flip-flop 110. A train of positive spikes is also provided by differentiator 104A, and this output passes through diode D11 and issues over lead 222 to the delay monostable circuit 108.

The delay monostable circuit 108 is very similar to the circuit 218 previously described. The positive spikes on lead 222 turn on the setting stage Q16, causing current to flow from the minus 41.8 volt source through R52 and winding N1' of core T3. The path is completed through D14, R53, and Q16 to the ground bus. This current causes core T3 to be driven to saturation. The drop across winding N1' energizes the base of sustaining stage Q15, causing that stage to turn on and draw current from R52 through R51, D13, Q15, R50, and R49 to the ground bus. The drop across R49 caused by the Q15 collector current keeps Q16 conducting during the setting of core T3. When T3 is saturated the impedance of winding N1′ decreases, and the voltage drop across it also decreases so that the base voltage of Q15 can no longer keep the sustaining stage Q15 conducting. Q15 then turns off and allows Q16 to turn off also. While the setting current is flowing through N1′ the appearance of further positive spikes on the lead 222 (as for example when a higher frequency than twenty cycles is being received) can have no effect on the operation of the delay monostable circuit 108 because Q16 is already saturated and another positive spike applied to its base can only clamp it a little more firmly in its saturated condition. During the setting phase of circuit operation the voltage induced in winding N2′ keeps the resetting transistor Q17 turned off, and the voltage induced in winding N3′ applies a slightly negative output to the lead 224 which is one of the output leads of the delay monostable circuit 108.

After the core T3 is set and the stages Q15 and Q16 have turned off the core flux relaxes back to its residual level, generating a voltage in winding N2′ which turns on the resetting transistor Q17. Current then flows from the minus 41.8 volt source through R56, Q17, and the resetting winding N3′ to the ground bus. This resets the core T3 and also provides a positive-going output voltage at the dotted end of winding N3′ which appears on the output lead 224. In case a positive spike should appear on the lead 222 during the time that the monostable circuit 108 is resetting itself and producing its positive output pulse, a noise immunity stage Q35 is connected from the base of the setting transistor Q16 to the ground bus. The base of this noise immunity stage Q35 is connected through R48 to the positive-going output lead 224. Thus, during the resetting and output-producing stage of operation of circuit 108 when the positive output voltage appears on lead 224 the noise immunity stage is biased into conduction. This causes Q35 to become a low impedance which clamps the base of Q16 near ground potential and renders it immune to any positive spikes occurring during this interval. The positive output on lead 224 is also applied to the gating circuit 106.

The flip-flop 110 is a complementary symmetry transistor bistable multivibrator circuit. In its set condition both stages Q18 and Q19 conduct. Stage Q18 draws current from the minus 41.8 volt source through R60 and R61 and Q18 to the ground bus. The drop across R60 resulting from this current keeps the base of Q19 sufficiently negative to keep Q19 conducting. Q19 draws current from the minus 41.8 volt supply and sends it through resistors R62 and R63 to the ground bus. The resulting drop across R63 keeps the base of Q18 sufficiently positive to keep Q18 conducting. The negative differentiator spike coming from circuit 104A over lead 221 resets the flip-flop 110 by negatively pulsing the base of Q18 to turn off Q18 and regeneratively turn off Q19 as well. The circuit may be set again by applying a negative pulse to the base of Q19, causing Q19 to turn on and regeneratively causing Q18 to turn on also.

This set signal is provided whenever the delay monostable circuit 108 is triggered by turning on its input transistor Q16. At this time, the collector current of Q16 is drawn through R52, N1′, and R53. The drop across these impedances causes the collector voltage of Q16 to decrease. When this voltage decreases diode D15 will begin to draw current through R57. The resulting negative-going signal developed across R57 is differentiated by a circuit 230 comprising a differentiating network R58, C16. Only the negative spikes developed by this differentiating network, corresponding to the turn-on of Q16, are transmitted through diode D16. These provide the negative set impulse to the base of transistor Q19; i.e. the impulse which sets the flip-flop 110.

The output of flip-flop 110 consists of the collector voltage of transistor Q19, which goes high when the flip-flop is set and the transistor Q19 is conducting, and goes low when the flip-flop is reset and Q19 is not conducting. This voltage is applied through a delay network 232 and emerges on a lead 234. Lead 234 is one of the three input leads to the and-gate 106. As previously mentioned, another input to the and-gate 106 comes in on lead 224 from the delay monostable circuit 108. This lead carries the positive output voltage which occurs at the bottom end of winding N3′ during the reset and output phase of the cycle of circuit 108. The third input to and-gate 106 comes in over a lead 236 from the differentiating circuit 104B. As previously mentioned, circuit 104B, along with circuit 104A, corresponds to the differentiator 104 of FIG. 1. However it has been stated that circuit 104A differentiates a voltage (the collector voltage of Q14) which goes positive when the Schmitt trigger 102 follows a positive half cycle of the input signal. Circuit 104B, on the other hand, differentiates a voltage (the collector voltage of transistor Q13) which goes positive when the Schmitt trigger 102 follows a negative half cycle of the input signal.

The three-input and-gate 106 comprises three transistors Q20, Q21, and Q22 connected in series. In order for the gate 106 to be enabled, all three of these gating transistors must be conducting. This occurs only when a suitable positive switch-on signal is applied to the base of each transistor by their respective gate input leads 234, 224, 236. This type of input is present on the lead 234 when the flip-flop 110 is set. It is present on the lead 224 when the delay monostable circuit 108 is undergoing its reset and output phase of operation. It is present on the lead 236 when the Schmitt trigger 102 is following a negative half cycle of the input signal. In other words, lead 236 carries an inverted version of the C minus spikes, lead 224 carries the D plus output pulse, and lead 234 carries the E plus flip-flop set output. When all these conditions coincide, the three gating transistors conduct simultaneously and the gate 106 is enabled. When this happens, a pulse of current is drawn through R68 and the three gating transistors to the minus 48 volt ground bus. The waveform of this pulse corresponds to the waveform of the shortest one of the three inputs required to keep gate 106 enabled, i.e. the C minus spike. Therefore the shape of the gate output depicted in FIG. 2F is similar to that of the negative spikes in FIG. 2C.

In the simplified showing of FIGS. 1 and 2 the C minus spike is seen to have the dual job of providing one of the three necessary inputs to the and-gate 106, and also resetting the flip-flop 110 to cut off another one of the three necessary gate inputs. This creates an unsound pulse race condition, since there is no assurance that the C minus spike would have time to pass through the gate 106 before it reset the flip-flop 110 to close the gate. For this reason, the delay network 232 is inserted between the flip-flop 110 and the and-gate 106. This assures that when the flip-flop 110 is reset, there will be a slight delay before this has the effect of disabling the gate 106. During this slight delay interval the C minus spike from differentiator circuit 104B is given the opportunity to pass through the gate 106.

The current pulse through R68 which occurs when gate 106 is enabled causes the bottom end of R68 to go negative. This negative-going potential represents the output voltage of the gate 106, and is applied to capacitor C19 of a differentiating network 240. Circuit 240 responds to negative-going inputs by triggering a one-shot multivibrator 242 which in turn feeds the diode pump integrator circuit 244. The output of the integrator 244 is squared up by a Schmitt trigger circuit 246. The Schmitt trigger output is clipped by a Zener diode D19 and boosted by an amplifier 248. The amplifier output may be used to draw load current through any suitable device, such as a relay coil connected across output terminals 5 and 14'. Thus, whenever the presence of the desired input signal is detected, i.e. a thousand cycles chopped at a twenty cycle rate, an output is provided by the gate 106. If this gate output continues for a sufficient time to pump up the integrator 244, the output relay is operated to perform some desired control function in response to the desired control input signal.

The operation of the harmonic filter will now be reexamined for the purpose of explaining the importance of the protective transistor Q35 which makes the delay monostable circuit 108 non-retriggerable in accordance with this invention. Referring to FIG. 2, the harmonic filtering action of this circuit can be summarized as follows. Each frequency-detecting cycle starts with a positive differentiator spike in waveform C. This C plus spike triggers one cycle of the delay monostable circuit 108, resulting in waveform D and setting the flip-flop 110 to bias the gate 106. In the event that a higher frequency than twenty cycles is received, then the first C minus spike occurs before the D plus output of the monostable circuit 108, and thus resets the flip-flop 110 to turn off the gate 106 before coincidence with the D plus pulse can occur. However, if the protective transistor Q35 were not present, and if the input frequency were high enough in relation to the duration of the D plus pulse, then later on a C plus spike followed by a C minus spike would both be applied to the base of transistor Q16 during the D plus phase of circuit 108. The positive spike would momentarily draw collector current through Q16 and cause its collector voltage to drop. The momentary Q16 collector negative impulse would pass through diode D15 and the differentiating circuit 230 to again set the flip-flop 110. If this happened, the gate 106 would again be biased on and, with the next C minus spike occurring during the remainder of the D plus output pulse, the gate would pass an output. This would allow the circuit to respond to any high enough frequency, regardless of its relation to the 20 cycle control signal. This effect can be minimized by reducing the D plus pulse duration, because then a higher frequency input is required to squeeze both a C plus spike and a C minus spike into the space of a D plus pulse. But reducing the D plus pulse duration also reduces the pass band width, which may not be an acceptable consequence.

To avoid this problem, transistor Q35 is turned on during the D plus phase of the monostable circuit 108 and thus causes any C plus spike which occurs during the D plus output to be short-circuited directly to the minus 48 volt ground bus instead of turning on the input transistor Q16. The transistor Q35 also protects the circuit from any positive-going noise impulses from any other source which may appear on the base input lead of transistor Q16 during the D plus output pulse.

Thus, it will be appreciated that this circuit is especially well-adapted to prevent a digital frequency-discriminating circuit from responding to odd harmonics of the control frequency when the control frequency is especially low, and is thus below the range in which it is convenient to use conventional resonant circuit low pass filters. However the circuit also blocks out spurious impulses and high frequency noise of any kind.

What has been described is a preferred embodiment and is presently believed to be the best mode of practicing the invention, but it will be clear to those skilled in this art that many modifications may be made without departing from the principles of the invention. Accordingly this description is intended merely as an illustrative example, the broader scope of the invention being stated in the appended claims.

The invention claimed is:

1. A digital frequency-discriminating circuit comprising:

means for receiving a periodic input signal and generating marker signals to mark the rising and falling portions thereof respectively;

a three-input and-gate connected to receive one of said marker signals as a first input;

delay means responsive to the other of said marker signals and connected to apply a second input to said and-gate a selected time interval after the occurrence of said other marker signal whereby said first and second and-gate inputs coincide only when said input signal has a frequency bearing a selected relation to said selected time interval;

and additional means responsive at least indirectly to said input signal and connected to supply a third input to said and-gate when said input signal has the selected frequency, and to terminate said third input to disable said and-gate when the frequency of said input signal is substantially greater than said selected frequency.

2. A digital frequency-discriminating circuit comprising:

means for receiving a periodic input signal and generating marker signals to mark the rising and falling portions thereof respectively;

a three-input and-gate connected to receive one of said marker signals as a first input;

delay means responsive to the other of said marker signals and connected to apply a second input to said and-gate a selected time interval after the occurrence of said other marker signal whereby said first and second and-gate inputs coincide only when said input signal has a frequency bearing a selected relation to said selected time interval;

and means responsive to said first marker signal and said delay means, and connected to supply a third input to said and-gate after receiving an output from said delay means and to terminate said third input after receiving said first marker signal to disable said and-gate when a half cycle of said input signal occupies a shorter period of time than said selected interval whereby to prevent response to a frequency higher than the selected frequency.

3. A digital frequency-discriminating circuit comprising:

means for receiving a periodic input signal and generating marker signals to mark the rising and falling portions thereof respectively;

a three-input and-gate connected to receive one of said marker signals as a first input;

delay means responsive to the other of said marker signals and connected to apply a second input to said and-gate a selected time interval after the occurrence of said other marker signal whereby said first and second and-gate inputs coincide only when said input signal has a frequency bearing a selected relation to said selected time interval;

and a bistable circuit responsive to said first marker signal and said delay means, and connected to supply a third input to said and-gate after receiving an output from said delay means and to terminate said third input after receiving said first marker signal to turn off said and-gate when a half cycle of said input signal occupies a shorter period of time than said selected interval whereby to prevent response to the third harmonic of the selected frequency.

4. A digital frequency-discriminating circuit comprising:

a Schmitt trigger connected to receive a periodic sinusoidal input signal, and producing a square wave output;

differentiating means connected to generate marker signals to mark the rising and falling portions respectively of said square wave;

a three-input and-gate connected to receive one of said marker signals as a first input;

a monostable magnetic multivibrator responsive to the other of said marker signals and connected to apply a second input to said and-gate a selected time interval after the occurrence of said other marker signal whereby said first and second and-gate inputs coincide only when said input signal has a frequency bearing a selected relation to said selected time interval;

and a flip-flop responsive to said first marker signal and said monostable multivibrator, and connected to supply a third input to said and-gate after receiving an output from said monostable multivibrator and to terminate said third input after receiving said first marker signal to turn off said and-gate when a half cycle of said input signal occupies a shorter period of time than said selected interval whereby to prevent response to the third harmonic of the selected frequency.

5. A digital frequency-discriminating circuit for detecting a periodic input signal of frequency $f_1$ chopped at a lower frequency $f_2$, comprising:

means for receiving said input signal and generating marker signals to mark the rising and falling portions thereof respectively;

a first and-gate connected to receive one of said marker signals as a first input;

a first delay means responsive to the other of said marker signals and connected to apply a second input to said and-gate a selected time interval after the occurrence of said other marker signal whereby said first and second and-gate inputs coincide only when said input signal has a frequency of substantially $f_1$;

means for receiving the output of said first and-gate and smoothing out the ripple in said output due to the presence of frequency $f_1$;

means for receiving said smoothed signal and generating marker signals to mark the rising and falling portions respectively thereof due to chopping at frequency $f_2$;

a three-input and-gate connected to receive one of said $f_2$ marker signals as a first input;

second delay means responsive to the other of said $f_2$ marker signals and connected to apply a second input to said three-input and-gate a selected time interval after the occurrence of said other $f_2$ marker signal whereby said first and second inputs to said three-input and-gate coincide only when the chopping frequency is substantially $f_2$.

6. A digital frequency-discriminating circuit for detecting a periodic input signal of frequency $f_1$ chopped at a lower frequency $f_2$, comprising:

means for receiving said input signal and generating marker signals to mark the rising and falling portions thereof respectively;

a first and-gate connected to receive one of said marker signals as a first input;

a first delay means responsive to the other of said marker signals and connected to apply a second input to said and-gate a selected time interval after the occurrence of said other marker signal whereby said first and second and-gate inputs coincide only when said input signal has a frequency of substantially $f_1$;

means for receiving the output of said first and-gate and smoothing out the ripple in said output due to the presence of frequency $f_1$;

means for receiving said smoothed signal and generating marker signals to mark the rising and falling portions respectively thereof due to chopping at frequency $f_2$;

a three-input and-gate connected to receive one of said $f_2$ marker signals as a first input;

second delay means responsive to the other of said $f_2$ marker signals and connected to apply a second input to said three-input and-gate a selected time interval after the occurrence of said other $f_2$ marker signal whereby said first and second inputs to said three-input and-gate coincide only when the chopping frequency is substantially $f_2$;

and a bistable circuit responsive to said first $f_2$ marker signal and said second delay means, and connected to supply a third input to said three-input and-gate after receiving an output from said second delay means and to terminate said third input after receiving said first $f_2$ marker signal to turn off said three-input and-gate when a half cycle of said input signal occupies a shorter period of time than said selected interval whereby to prevent response to the third harmonic of said chopping frequency $f_2$.

7. A digital frequency-discriminating circuit as in claim 1, wherein said delay means is a non-retriggerable monostable multivibrator comprising:

an input circuit;

an output circuit producing an output voltage during at least a part of the operating cycle of said monostable multivibrator;

and an electronic switch shunted across said input circuit and including a control electrode connected to said output circuit whereby said output voltage turns on said electronic switch to short-circuit voltages applied to said input circuit.

8. A digital frequency-discriminating circuit as in claim 1, wherein said delay means is a non-retriggerable monostable magnetic multivibrator circuit comprising:

an input circuit comprising an input stage having a control electrode to which input pulses may be applied for triggering said multivibrator;

a magnetic core;

said input circuit including means for saturating said magnetic core when said multivibrator is triggered;

an output circuit responsive to saturation of said magnetic core by said input circuit to reset said core to saturation in an opposite direction said output circuit including an impedance across which an output voltage is developed during said resetting operation;

an electronic switch connected to short-circuit said control electrode of said input stage when said electronic switch is enabled, and including a control electrode connected to receive the said output voltage developed by said output circuit, said electronic switch being enabled by said output voltage whereby to prevent the re-triggering of said multivibrator during said resetting operation.

References Cited

UNITED STATES PATENTS

| | | |
|---|---|---|
| 3,184,606 | 5/1965 | Ovenden et al. |
| 3,200,263 | 8/1965 | Zenzefilis. |

JOHN W. CALDWELL, *Primary Examiner.*

DONALD J. YUSKO, *Examiner.*